United States Patent

Nash et al.

[11] Patent Number: 6,066,708
[45] Date of Patent: May 23, 2000

[54] COPOLYMER PRODUCTION, PRODUCT THEREOF AND DILUENT REMOVAL THEREFROM

[75] Inventors: Larry L. Nash, Bartlesville, Okla.; Carleton E. Stouffer, Houston, Tex.; George A. Moczygemba, Bartlesville, Okla.; Richard Peacock, Missouri City, Tex.; Ralph C. Farrar, Jr., Bartlesville, Okla.

[73] Assignee: Phillips Petroleum Company, Bartlesville, Okla.

[21] Appl. No.: 08/921,418

[22] Filed: Aug. 29, 1997

[51] Int. Cl.[7] .......................... C08F 36/00; C08F 293/00
[52] U.S. Cl. ............................. 526/335; 525/314
[58] Field of Search ........................ 526/335; 528/481; 34/27; 525/314

[56] References Cited

U.S. PATENT DOCUMENTS

| 4,415,721 | 11/1983 | Kosanovich et al. | 528/176 |
|---|---|---|---|
| 4,490,519 | 12/1984 | Kosanovich et al. | 528/179 |
| 4,537,954 | 8/1985 | Ando et al. | 528/481 |
| 4,575,950 | 3/1986 | Miles | 34/27 |
| 4,672,094 | 6/1987 | Nelb, II et al. | 525/440 |
| 4,722,809 | 2/1988 | Andrews et al. | 252/609 |
| 5,321,099 | 6/1994 | Goldwasser et al. | 525/432 |
| 5,436,298 | 7/1995 | Moczygemba et al. | 525/314 |
| 5,795,938 | 8/1998 | Knoll et al. | 525/98 |

FOREIGN PATENT DOCUMENTS

| 0 286 071 | 10/1988 | European Pat. Off. . |
|---|---|---|
| 34 09 066 | 9/1984 | Germany . |
| 44 45 141 | 6/1996 | Germany . |
| 05287033A | 4/1992 | Japan . |
| WO 94 04333A | 3/1994 | WIPO . |

*Primary Examiner*—David W. Wu
*Assistant Examiner*—Tanya Zalukaeva
*Attorney, Agent, or Firm*—Richmond, Hitchcock, Fish & Dollar

[57] ABSTRACT

This invention provides a process to produce a composition that comprises diluent and copolymer and also provides the composition. The process of this invention comprises: (a) producing a composition that comprises diluent and copolymer; and (b) removing a portion of said diluent from said composition. This produces a composition that has a lower amount of diluent and a lower amount of imperfections.

29 Claims, No Drawings

COPOLYMER PRODUCTION, PRODUCT THEREOF AND DILUENT REMOVAL THEREFROM

FIELD OF THE INVENTION

This invention is in the field of compositions that comprise diluent and copolymer. The diluent comprises solvent and optionally volatiles. The solvent comprises aliphatic compounds, or alicyclic compounds, or mixtures of these compounds. The copolymer comprises polymerized monomers where said monomers are selected from the group consisting of monovinylarenes and dienes.

BACKGROUND OF THE INVENTION

In general, the copolymerization of monovinylarenes and dienes is conducted in a diluent. This copolymerization produces a mixture that comprises such diluent and a copolymer. After this copolymerization, steps are taken to remove as much of the diluent as possible from such mixture, in order to produce a composition that has a lower amount of diluent. It is desirable to have compositions with a lower amount of diluent because they can be more readily used in food and medical applications.

The prior-art-processes used to remove such diluent from such mixtures have not been satisfactory. The severe processing conditions to which such mixtures must be subjected, in order to achieve lower amounts of diluent in compositions made from such mixtures, have a profoundly detrimental effect on the quality of the final product. These severe processing conditions have the adverse effect of increasing the amount of imperfections in such compositions.

Copolymers of dienes and monovinylarenes contain main and side chain unsaturation (from the dienes) that make the copolymers especially prone to degradative changes in severe finishing operations. While this unsaturation makes finishing difficult it is primarily responsible for certain critically necessary properties that make these copolymers commercially important. The degradative changes in the copolymer due to severe processing can be quite varied and extensive. Included in these changes may be increased color, reduced copolymer stability, reduced stabilizer levels, and generally increased sensitivity to molding problems in a customer's plant. The most important of the degradative changes involves crosslinking and gelation of the copolymer to form gels (sometimes called "fisheyes") and black specks that show up as surface imperfections in product molding and especially in sheet and film applications. The more severe the finishing operation, the more extensive the degradative changes will be. A high level of gels and black specks are visually apparent in most commercial applications of these copolymers and are unacceptable to most customers.

Consequently, we have two competing priorities:

(1) a desire to produce compositions that comprise diluent and copolymer, where such compositions have a lower amount of diluent, and where such diluent comprises solvent and optionally volatiles, and where such solvent comprises aliphatic compounds, or alicyclic compounds, or mixtures of these compounds, and where such copolymer comprises polymerized monomers where said monomers are selected from the group consisting of monovinylarenes and dienes; and (2) a desire to produce compositions that comprise diluent and copolymer, where such compositions have a lower amount of imperfections, and where such diluent comprises solvent and optionally volatiles, and where such solvent comprises aliphatic compounds, or alicyclic compounds, or mixtures of these compounds, and where such copolymer comprises polymerized monomers where said monomers are selected from the group consisting of monovinylarenes and dienes.

Until now, however, a process has not been developed that produces the desired compositions.

Therefore, the inventors provide this invention because the process of this invention will produce the desired composition, and consequently, this invention will be useful both economically and technologically to a producer of such compositions.

SUMMARY OF THE INVENTION

It is an object of this invention to provide a process that produces compositions that comprise diluent and copolymer, where such compositions have a lower amount of diluent and/or imperfections than prior art compositions produced by prior art processes, and where such diluent comprises solvent and optionally volatiles, and where such solvent comprises aliphatic compounds, or alicyclic compounds, or mixtures of these compounds, and where such copolymer comprises polymerized monomers where such monomers are selected from the group consisting of monovinylarenes and dienes.

It is another object to provide compositions that comprise diluent and copolymer, where such compositions have a lower amount of diluent and/or imperfections than prior art compositions produced by prior art processes, and where such diluent comprises solvent and optionally volatiles, and where such solvent comprises aliphatic compounds, or alicyclic compounds, or mixtures of these compounds, and where such copolymer comprises polymerized monomers where such monomers are selected from the group consisting of monovinylarenes and dienes.

In accordance with this invention a process to produce a composition is provided. This process comprises:

(a) producing a First Composition that comprises diluent and copolymer, where said diluent comprises solvent and optionally volatiles, and where said solvent comprises aliphatic compounds, alicyclic compounds, or mixtures of these compounds, and where said copolymer comprises polymerized monomers where said monomers are selected from the group consisting of monovinylarenes and dienes, and where such monovinylarenes and dienes are a majority of said copolymer as measured by weight percent, and where the amount of said copolymer in said First Composition is in the range of about 15 to about 75 weight percent based on the weight of said First Composition, and where said First Composition is at a temperature above the boiling point of the diluent;

(b) removing a portion of said diluent from said First Composition in a First Vessel, where said First Vessel comprises a First Separating Section and a First Shearing Section, and where said First Separating Section has a temperature in the range of about 110° C. to about 210° C. and a pressure in the range of about 130 kPa to about 1000 kPa, to produce a Second Composition that has a lower amount of said diluent than said First Composition, and where said First Shearing Section has a temperature in the range of about 110° C. to about 210° C. and a pressure in the range of about 130 kPa to about 1000 kPa, to produce a Third Composition that has a lower amount of diluent than said Second Composition; and (c) removing a portion of said diluent from said Third Composition in a Second Vessel, where said Second Vessel comprises a Second Separating Section and a Second Shearing Section, and where said Second Separating Section has a temperature in the range of about 110° C. to about 210° C. and a pressure in the range of 0 kPa to about 75 kPa, to produce a Fourth Composition that has a lower amount of said diluent than said Third Composition, and where said Second Shearing Section has a temperature in the range of about 110° C. to about 210° C. and a pressure in the range of 0 kPa to about 75 kPa, to produce a Fifth Composition that has a lower amount of diluent than said Fourth Composition.

In accordance with this invention a composition is provided. This composition comprises diluent and copolymer, where said diluent comprises solvent and optionally volatiles, and where said solvent comprises aliphatic compounds, alicyclic compounds, or mixtures of these compounds, and where said copolymer comprises polymerized monomers where said monomers are selected from the group consisting of monovinylarenes and dienes, and where such monovinylarenes and dienes are a majority of said copolymer as measured by weight percent, and where the amount of diluent in said composition is less than 1400 parts per million by weight based on the weight of said composition, and where the amount of imperfections in a 10 mil sheet of an extruded portion of such composition is less than 10 per 100 square inches of such sheet (as hereafter defined), and where said composition has been produced in a commercial scale plant (as hereafter defined).

In accordance with this invention a composition is provided. This composition comprises diluent and copolymer, where said diluent comprises solvent and optionally volatiles, and where said solvent comprises aliphatic compounds, alicyclic compounds, or mixtures of these compounds, and where said copolymer comprises polymerized monomers where said monomers are selected from the group consisting of monovinylarenes and dienes, and where such monovinylarenes and dienes are a majority of said copolymer as measured by weight percent, and where the amount of diluent in said composition is about 25 weight percent less than the amount of diluent in a comparative copolymer composition (as hereafter defined).

Advantages and benefits of this invention will become better understood with reference to the following.

DETAILED DESCRIPTION OF THE INVENTION

In general, the process of this invention produces a composition that comprises diluent and copolymer, where said composition has a lower amount of diluent and a lower amount of imperfections than prior art compositions produced by prior art processes.

The first step of this invention comprises producing a First Composition. This First Composition comprises diluent and copolymer. Said diluent comprises solvent and optionally volatiles.

The solvent comprises aliphatic compounds, or alicyclic compounds (hereafter collectively called "non-aromatic compounds"), or mixtures of these compounds (see HAWLEY'S CONDENSED CHEMICAL DICTIONARY, Eleventh Edition, pages 34–35, (1987) for the definitions of "aliphatic" and "alicyclic"). These non-aromatic compounds have from 2 to about 20 carbon atoms, preferably about 4 to about 16 carbon atoms, and most preferably about 5 to about 12 carbon atoms. Alicyclic compounds are currently preferred. Suitable examples of such non-aromatic compounds include, but are not limited to, ethane, propane, butane, pentane, hexane, heptane, octane, nonane, decane, cyclopentane, cyclohexane, cycloheptane, cyclooctane, cyclononane, and cyclodecane. Currently, cyclohexane and cyclopentane are most preferred. In a slurry polymerization, pentane, hexane, or a mixture thereof is preferred.

In general, the diluent, in the reactor, can comprise one or more of the non-aromatic compounds and a small amount (usually less than 15 weight percent of the diluent, and preferably less than one weight percent of the diluent) of other compounds (sometimes called volatiles), so long as such other compounds do not substantially and adversely affect the polymerization. In general, such other compounds can be non-polymerized monomers, initiator hydrolysis products, coupling agent components, and additives from the polymerization process. Examples of such other compounds are styrene, diethylbenzene, n-propyl benzene, isopropyl benzene, 4-vinylcyclohexene and alpha methyl styrene. It should be noted that such compounds can impart a undesirable odor that is hard to remove without damaging the copolymer.

The copolymer comprises polymerized monomers where such monomers are selected from the group consisting of monovinylarenes and dienes. However, sometimes such copolymers can have a small amount (usually less than five weight percent of the copolymer, and preferably less than one weight percent of the copolymer) of other polymerized compounds, so long as such other polymerized compounds do not substantially and adversely affect the physical properties or transparency of the copolymer or of blends of the copolymer with other polymers such as, for example, polystyrene. Additionally, it should be noted that the monovinylarenes and dienes comprise the majority of the copolymer as measured by weight percent.

The monovinylarenes that can be used in this invention contain, in general, about 8 to about 20 carbon atoms, preferably about 8 to about 16 carbon atoms, and most preferably 8 to 12 carbon atoms. These carbon atoms are arranged in an aromatic structure and further are arranged to have one vinyl group, where such vinyl group is in a position useable for the polymerization. For example, the vinyl group should be in a configuration to make it active for anionic polymerization by an alkyl lithium or polymer lithium initiator. Suitable examples of such monovinylarenes include, but are not limited to, styrene, alphamethylstyrene, 4-methylstyrene, 3-methylstyrene, 2-methylstyrene, 4-ethylstyrene, 3-ethylstyrene, 2-ethylstyrene, 4-tert-butyl styrene, 2,4-dimethylstyrene, vinyl naphthalene, and mixtures thereof. Currently, the most preferred monovinylarene is styrene.

The dienes that can be used in this invention contain from 3 to about 12 carbon atoms, preferably about 4 to about 10 carbon atoms, and most preferably 4 to 8 carbon atoms. These carbon atoms are arranged so that two conjugated double bonds are available for the polymerization. Suitable examples of such dienes include, but are not limited to, 1,3 butadiene, 2-methyl-1,3-butadiene, 2-ethyl-1,3-butadiene, 2,3-dimethyl-1,3 butadiene, 1,3 pentadiene, and mixtures thereof. Currently, the most preferred diene is 1,3 butadiene.

Processes that produce copolymers from such monomers are known in the art. For example, there are a variety of anionic polymerization processes that produce copolymers from such monomers. Exemplary processes, from the Phillips Petroleum Company, are disclosed in the following U.S. Pat. Nos. 4,051,197; 4,091,053; 4,104,326; 4,403,074;

4,584,346; 4,704,434; 4,704,435; 5,227,419; 5,256,736; 5,369,174; 5,290,875; 5,399,628; and 5,438,103; the entire disclosures of which are hereby incorporated by reference. These patents have been assigned to the Phillips Petroleum Company, Bartlesville, Okla., 74004, (918)-661-6600. It should be noted that other competitive copolymers produced in similar anionic polymerizations would also benefit from this inventive process.

In general, the amount of copolymer in the First Composition is in the range of about 15 to about 75 weight percent, preferably from about 25 to about 55 weight percent, and most preferably from about 30 to about 40 weight percent, based on the weight of the First Composition. An amount less than 15 weight percent tends to be uneconomical to process, while weight percents greater than 75 weight percent promotes unacceptable problems in heat transfer and control.

The First Composition, comprising diluent and copolymer, should be at a temperature above the boiling point of the diluent at the pressure to which said First Composition is being subjected. Generally, this means that the temperature should be in the range of about 110° C. to about 210° C., preferably about 130° C. to about 200° C., and most preferably about 140° C. to about 190° C. Temperatures below 110° C. are undesirable because the diluent might not be above its boiling point at that temperature and pressure, thereby making it more difficult to remove such diluent, while temperatures greater than about 210° C. are undesirable because they promote formation of gels and/or imperfections and cause the resin to be downgraded in quality.

The second step of this invention comprises, in part, producing a Second Composition. This Second Composition comprises diluent and copolymer. This Second Composition is produced by removing a portion of the diluent from the First Composition.

This removing operation is conducted in a First Vessel, where said First Vessel comprises a First Separating Section and a First Shearing Section.

The First Separating Section has a temperature in the range of about 110° C. to about 210° C., preferably about 130° C. to about 200° C. and most preferably about 140° C. to about 190° C. The temperature of the First Separating Section is generally higher than the temperature of the First Composition as it enters the First Separating Section. However, in general, temperatures below 110° C. are undesirable because the diluent might not be above its boiling point at that temperature and pressure, thereby making it more difficult to remove such diluent, while temperatures greater than about 210° C. are undesirable because they promote the formation of imperfections in the final product.

The First Separating Section has a pressure in the range of about 130 kPa to about 1000 kPa, preferably about 160 kPa to about 750 kPa, and most preferably about 200 kPa to about 400 kPa. Pressures below 130 kPa are undesirable because the amount of foaming that occurs in the First Separation Section, while pressures above 1000 kPa are undesirable because they adversely affect the amount of diluent removed from the First Composition.

The First Separation Section also has an outlet to a diluent collector.

After the First Separation Section the Second Composition has a lower amount of diluent than the First Composition.

The second step of the inventive process of this invention also comprises, in part, producing a Third Composition. This Third Composition comprises diluent and copolymer. This Third Composition is produced by shearing the Second Composition and thereby removing a portion of the diluent from the Second Composition.

The First Shearing Section has a temperature in the range of about 110° C. to about 210° C., preferably about 130° C. to about 200° C., and most preferably about 140° C. to about 190° C. However, in general, temperatures below 110° C. are undesirable because the diluent might not be above its boiling point at that temperature and pressure thereby making it more difficult to remove such diluent, while temperatures greater than about 210° C. are undesirable because they promote the formation of imperfections in the final product.

The First Shearing Section has a pressure in the range of about 130 kPa to about 1000 kPa, preferably about 160 to about 750, and most preferably about 200 kPa to about 400 kPa. Pressures below 130 kPa are undesirable because the amount of foaming that occurs in the First Shearing Section and pressures above 1000 kPa are undesirable because they adversely affect the amount of diluent removed from the Second Composition.

After the First Shearing Section, the Third Composition has a lower amount of diluent than the Second Composition.

In general, the amount of copolymer in the Third Composition is in the range of about 80 to about 99 weight percent, preferably from about 85 to about 99 weight percent, and most preferably from about 90 to about 99 weight percent, based on the weight of the Third Composition. An amount less than 80 weight percent is undesirable because foaming can occur in the Second Vessel and weight percents greater than 99 weight percent are undesirable because it can lead to line plugging.

The First Vessel, in general, can be described as a mechanically-agitated-thin-film-evaporator vessel. Such vessels are available of appropriate construction and motor horse power capacity for materials of varying viscosities.

Such vessels can be obtained from LCI Corporation, P.O. Box 16348, Charlotte, N.C., 28297-8804.

In general, it is preferred that the First Vessel be a mechanically-agitated-thin-film-evaporator vessel, which is equipped with motor driven rotor blades, or rotor disks. However, various combination of these rotors can also be used.

In general, the Second Composition is transported through the First Vessel, in part, by rotation of the rotor such that the Second Composition is in the form of a thin film that primarily adheres to the inner wall of said First Vessel.

The third step of the inventive process of this invention comprises, in part, producing a Fourth Composition. This Fourth Composition comprises diluent and copolymer. This Fourth Composition is produced by removing a portion of the diluent from the Third Composition.

This means that the First Vessel and the Second Vessel are in fluid-flow communication. Additionally, it should be noted that the temperature and pressure are maintained to prevent flashing in the line between such vessels.

This removing operation is conducted in a Second Vessel, where said Second Vessel comprises a Second Separating Section and a Second Shearing Section.

The Second Separating Section has a temperature in the range of about 110° C. to about 210° C., preferably about 130° C. to about 200° C., and most preferably about 140° C. to about 190° C. The temperature of the Second Separating Section is generally higher than the temperature of the Third Composition as it enters said Second Separating Section.

However, in general, temperatures below 110° C. are undesirable because the compositions become too viscous for proper operability, while temperatures greater than about 210° C. are undesirable because they promote the formation of imperfections in the final product.

The Second Separating Section has a pressure in the range of 0 kPa to about 75 kPa, preferably 0 to about 50, and most preferably 0 kPa to about 20 kPa. Pressures above 75 kPa are undesirable because less diluent will be removed.

The Second Separation Section also has an outlet to a diluent collector.

After the Second Separation Section the Fourth Composition has a lower amount of diluent than the Third Composition.

The third step of the inventive process of this invention also comprises, in part, producing a Fifth Composition. This Fifth Composition comprises diluent and copolymer. This Fifth Composition is produced by shearing the Fourth Composition and thereby removing a portion of the diluent from the Fourth Composition.

The Second Shearing Section has a temperature in the range of about 110° C. to about 210° C., preferably about 130° C. to about 200° C., and most preferably about 140° C. to about 190° C. However, temperatures below 110° C. are undesirable because the compositions might have poor transport characteristics, while temperatures greater than about 210° C. are undesirable because they promote the formation of imperfections in the final product.

The Second Shearing Section has a pressure in the range of 0 kPa to about 75 kPa, preferably 0 to about 50, and most preferably 0 kPa to about 20 kPa. Pressures above 75 kPa are undesirable because less diluent will be removed.

After the Second Shearing Section the Fifth Composition has a lower amount of diluent than the Fourth Composition.

In general, the amount of diluent in the Fifth Composition is less than 1400 parts per million by weight, preferably less than 1200 parts per million by weight, even more preferably less than 1000 parts per million by weight and most preferably less than 500 parts per million by weight, based on the weight of the Fifth Composition.

In general, the amount of fisheyes in a 10 mil sheet of extruded Fifth Composition is less than 10, preferably less than 8, even more preferably less than 6, and most preferably less than 4 per 100 square inches of such sheet. Indeed it is very desirable to produce fisheyes at a level less than 2 per 100 square inches of sheet.

The Second Vessel can, in general, also be described as a mechanically-agitated-thin-film-evaporator vessel such as the First Vessel.

In general, it is preferred that the Second Vessel be a counter-current-flow-mechanically-agitated-thin-film-evaporator vessel, which is equipped with motor driven rotor blades, or rotor disks. However, various combination of these rotors can also be used.

In general, the Fourth Composition is transported through the Second Vessel, in part, by rotation of the rotor such that the Fourth Composition is in the form of a thin film that primarily adheres to the inner wall of said Second Vessel. The direction of movement of the Fourth Composition is counter to the direction of a flow gas used to further remove diluent from the Fourth Composition. The flow gas can be any gas that does not substantially and adversely affect the formation of the Fifth Composition. A suitable gas is nitrogen, carbon dioxide, and/or steam.

For the purposes of this specification, a prior art composition produced by using said First Vessel followed by using a devolatilizing extruder to form such composition, from the First Composition, shall be called a "comparative copolymer composition". The devolatilizing extruder for this definition is a 40 mm diameter co-rotating, fully intermeshing, twin screw devolatilizing extruder. A suitable example of such an extruder is a Model ZSK-40 twin screw devolatilizing extruder (available from Werner & Pfleiderer Corp., 633-T East Crescent Ave., Ramsey, N.J. 07446).

For any given low amount of imperfections in the finished composition produced in accordance with this invention such composition will have 25 weight percent less diluent than a comparative copolymer composition, preferably 50 percent less diluent, and most preferably 75 percent less diluent. However, in general, it is uneconomical to remove all of the diluent, consequently some diluent will remain in the inventive composition. However, an inventive composition produced from a First Composition will have a lower amount of diluent than a comparative copolymer composition produced from such First Composition.

For the purposes of this specification a "commercial scale plant" is a plant that produces compositions that comprise diluent and copolymer, where said diluent comprises solvent and optionally volatiles, where such solvent comprises aliphatic compounds, or alicyclic compounds, or mixtures of these compounds, and where such copolymer comprises polymerized monomers where such monomers are selected from the group consisting of monovinylarenes and dienes, at rates exceeding 5000 pounds per hour per line of production.

EXAMPLES

These examples are provided to illustrate this invention. The scope of the claimed invention should not be limited by these examples.

A composition comprising diluent and a copolymer, where said diluent comprised solvent and volatiles, and where said solvent was cyclohexene, and where said volatiles comprised monomers and additives, and said copolymer comprised polymerized styrene and butadiene, was prepared using equipment and procedures detailed in patents previously cited. This composition of diluent (about 67 weight percent) and copolymer (about 33 weight percent) is the First Composition.

In the Inventive Examples which follows, a portion of the First Composition is passed through a First Vessel, comprising a First Separating Section and a First Shearing Section, to produce a Third Composition, and then this Third Composition is passed through a Second Vessel, which comprises a Second Separating Section and a Second Shearing Section to produce a Fifth Composition.

In the Comparison Examples, another portion of the First Composition is passed through a First Vessel comprising a Separating Section and a Shearing Section to produce a Third Composition, and then this Third Composition is passed through a devolatilizing extruder. The final products from each process are compared and contrasted. Composition is passed through a devolatilizing extruder. The final products from each process are compared and contrasted.

INVENTIVE EXAMPLES

A portion of the First Composition, which comprised said diluent and a copolymer, where said copolymer comprised polymerized monomers selected from the group consisting of styrene and butadiene, and which had a temperature of 155° C., was fed at 36 kg/hr into a First Vessel (Vistran Model HS-150 Agitated Thin Film Evaporator available from LCI Corporation, P.O. Box 16348, Charlotte, N.C. 28297-8804). In this First Vessel, the Second Composition was produced from the First Composition and the Third Composition was produced from the Second Composition.

The temperature of First Separating Section was about 135° C. The pressure of the First Separating Section was about 283 kPa. The temperature of First Shearing Section was about 180° C. The pressure of the First Shearing Section was about 283 kPa.

The Third Composition was passed into a Second Vessel. In this Second Vessel, the Fourth Composition was produced from the Third Composition and the Fifth Composition was produced from the Fourth Composition.

The temperature of Second Separating Section was about 180° C. The pressure of the Second Separating Section was about 5 kPa. The temperature Additionally, it should be noted that the counter current steam flow was set at 0.29 kg/hr.

Hourly samples were taken from the output from the Second Vessel over a 20-hour period. These samples were analyzed for residual cyclohexane and, in some cases, for average imperfections.

Results are shown in Table One, samples 1A–1T.

TABLE 1

| Sample Number | Time, Hours | Residual Cyclohexane (ppmw) | Average Imperfections |
|---|---|---|---|
| 1A | 1 | 125 | 2.2 |
| 1B | 2 | 123 |  |
| 1C | 3 | 136 | 1.6 |
| 1D | 4 | 134 |  |
| 1E | 5 | 164 | 1.8 |
| 1F | 6 | 136 |  |
| 1G | 7 | 134 | 3.2 |
| 1H | 8 | 123 |  |
| 1I | 9 | 126 | 1 |
| 1J | 10 | 112 |  |
| 1K | 11 | 101 | 2.2 |
| 1L | 12 | 106 |  |
| 1M | 13 | 116 | 1 |
| 1N | 14 | 104 |  |
| 1O | 15 | 104 | 1.4 |
| 1P | 16 | 100 |  |
| 1Q | 17 | 110 | 0.4 |
| 1R | 18 | 105 |  |
| 1S | 19 | 105 | 2 |
| 1T | 20 | 113 |  |

In a second inventive Example, another portion of the First Composition, was processed under different conditions than in the first inventive Example.

The temperature of First Separating Section was about 135° C. The pressure of the First Separating Section was about 283 kPa. The temperature of First Shearing Section was about 180° C. The pressure of the First Shearing Section was about 283 kPa.

The Third Composition was passed into a Second Vessel. In this Second Vessel, the Fourth Composition was produced from the Third Composition and the Fifth Composition was produced from the Fourth Composition.

The temperature of Second Separating Section was about 180° C. The pressure of the Second Separating Section was about 3 kPa. The temperature of Second Shearing Section was about 180° C. The pressure of the Second Shearing Section was about 3 kPa. The rotor speed was about 150 rpm. Additionally, it should be noted that the counter current steam flow was set at 0.29 kg/hr.

Hourly samples were taken from the output from the Second Vessel over a 12-hour period. These samples were analyzed for residual cyclohexane and/or for average imperfections except for one sample.

Results are shown in Table One, samples 2A–2L

TABLE 1

| Sample # | Time, Hours | Residual Cyclohexane (ppmw) | Average Imperfections |
|---|---|---|---|
| 2A | 1 | 107 | 3 |
| 2B | 2 | 101 |  |
| 2C | 3 | 102 | 0.6 |
| 2D | 4 | 96 |  |
| 2E | 5 |  | 1.8 |
| 2F | 6 | 105 |  |
| 2G | 7 | 95 | 4 |
| 2H | 8 | 92 |  |
| 2I | 9 | 92 | 4.6 |
| 2J | 10 |  |  |
| 2K | 11 | 92 | 5.4 |
| 2L | 12 | 99 |  |

In a third inventive Example, another portion of the First Composition, was processed under different conditions than in the first inventive Example.

In this First Vessel, the Second Composition was produced from the First Composition and the Third Composition was produced from the Second Composition.

The temperature of First Separating Section was about 135° C. The pressure of the First Separating Section was about 283 kPa. The temperature of First Shearing Section was about 180° C. The pressure of the First Shearing Section was about 283 kPa.

The Third Composition was passed into a Second Vessel. In this Second Vessel, the Fourth Composition was produced from the Third Composition and the Fifth Composition was produced from the Fourth Composition.

The temperature of Second Separating Section was about 180° C. The pressure of the Second Separating Section was about 0.8 kPa. The temperature of Second Shearing Section was about 180° C. The pressure of the Second Shearing Section was about 0.8 kPa. The rotor speed was about 150 rpm. Additionally, it should be noted that the counter current steam flow was set at 0.29 kg/hr.

Hourly samples were taken from the output from the Second Vessel over a 12-hour period. These samples were analyzed for residual cyclohexane and, in some cases, for average imperfections.

Results are shown in Table One, samples 3A–3L.

TABLE 1

| Sample # | Time, Hours | Residual Cyclohexane (ppmw) | Average Imperfections |
|---|---|---|---|
| 3A | 1 | 81 | 1.6 |
| 3B | 2 | 103 |  |
| 3C | 3 | 87 | 2 |
| 3D | 4 | 82 |  |
| 3E | 5 | 89 | 1.4 |
| 3F | 6 | 89 |  |
| 3G | 7 | 83 | 0.8 |
| 3H | 8 | 84 |  |
| 3I | 9 | 97 | 0.8 |
| 3J | 10 | 99 |  |
| 3K | 11 | 89 | 1.8 |
| 3L | 12 | 95 |  |

In a fourth inventive Example, another portion of the First Composition, was processed under different conditions than in the first inventive Example.

In this First Vessel, the Second Composition was produced from the First Composition and the Third Composition was produced from the Second Composition.

The temperature of First Separating Section was about 135° C. The pressure of the First Separating Section was about 283 kPa. The temperature of First Shearing Section was about 180° C. The pressure of the First Shearing Section was about 283 kPa.

The Third Composition was passed into a Second Vessel. In this Second Vessel, the Fourth Composition was produced from the Third Composition and the Fifth Composition was produced from the Fourth Composition.

The temperature of Second Separating Section was about 180° C. The pressure of the Second Separating Section was about 0.8 kPa. The temperature of Second Shearing Section was about 180° C. The pressure of the Second Shearing Section was about 0.8 kPa. The rotor speed was about 150 rpm. Additionally, it should be noted that the counter current steam flow was set at 0.29 kg/hr.

Hourly samples were taken from the output from the Second Vessel over a 6-hour period. These samples were analyzed for residual cyclohexane and, in some cases, for average imperfections.

Results are shown in Table One, samples 4A–4F.

TABLE 1

| Sample # | Time, Hours | Residual Cyclohexane (ppmw) | Average Imperfections |
|---|---|---|---|
| 4A | 1 | 80 | 4 |
| 4B | 2 | 77 | |
| 4C | 3 | 84 | 2.4 |
| 4D | 4 | 81 | |
| 4E | 5 | 77 | 1.4 |
| 4F | 6 | 80 | |

COMPARATIVE EXAMPLES

Another portion of the First Composition was fed to the First Vessel.

In this First Vessel, the Second Composition was produced from the First Composition and the Third Composition was produced from the Second Composition.

The temperature of First Separating Section was about 135° C. The pressure of the First Separating Section was about 283 kPa. The temperature of First Shearing Section was about 180° C. The pressure of the First Shearing Section was about 283 kPa.

The Third Composition was passed into a Model ZSK-40 twin screw devolatilizing extruder (available from Werner & Pfleiderer Corp., 633-T East Crescent Ave., Ramsey, N.J. 07446). The feed pressure was maintained at 80 psig, the feed rate was set at 36 kg/hr, and the screw speed at 275 rpm, under the following extruder vacuum pressures: Zone 1, 100 mm Hg; Zone 2, 50 mm Hg; Zone 3, 20 mm Hg. Additionally, this extruder had two vents where water was added to the extruder. These vents allowed 0.5 and 0.7 parts water per hundred part resin into the extruder. Extruder output was sampled hourly over a 17-hour period. The samples were analyzed for residual cyclohexane and for average imperfections.

Results are shown in Table Two, samples 1–17.

TABLE 2

| Sample # | Time, Hours | Residual Cyclohexane (ppmw) | Average Imperfections |
|---|---|---|---|
| 1 | 1 | 424 | 8.8 |
| 2 | 2 | 474 | 7 |
| 3 | 3 | 448 | 17.25 |
| 4 | 4 | 477 | 10 |
| 5 | 5 | 469 | 10.6 |
| 6 | 6 | 449 | 8.8 |
| 7 | 7 | 441 | 7.6 |
| 8 | 8 | 472 | 6.2 |
| 9 | 9 | 434 | 9.2 |
| 10 | 10 | 474 | 10 |
| 11 | 11 | 440 | 4.4 |
| 12 | 14 | 509 | 9 |
| 13 | 13 | 502 | 7.2 |
| 14 | 14 | 515 | 9.2 |
| 15 | 15 | 460 | 8.8 |
| 16 | 16 | 473 | 11.2 |
| 17 | 17 | 433 | 11.4 |

In this second comparative Example another portion of the First Composition was fed to the First Vessel.

In this First Vessel, the Second Composition was produced from the First Composition and the Third Composition was produced from the Second Composition.

The temperature of First Separating Section was about 135° C. The pressure of the First Separating Section was about 283 kPa. The temperature of First Shearing Section was about 180° C. The pressure of the First Shearing Section was about 283 kPa.

The Third Composition was passed into a Model ZSK-40 twin screw devolatilizing extruder. The feed pressure was maintained at 200 psig, the feed rate was set at 36 kg/hr, and the screw speed at 275 rpm, under the following extruder vacuum pressures: Zone 1, 100 mm Hg; Zone 2, 50 mm Hg; Zone 3, 20 mm Hg. Additionally, this extruder had two vents where water was added to the extruder. These vents allowed 0.5 and 0.7 parts water per hundred part resin into the extruder. Extruder output was sampled hourly over a 18-hour period. The samples were analyzed for residual cyclohexane and for average imperfections.

Results are shown in Table Two, samples 2A–2R.

TABLE 2

| Sample # | Time, Hours | Residual Cyclohexane (ppmw) | Average Imperfections |
|---|---|---|---|
| 2A | 1 | 487 | 11.6 |
| 2B | 2 | 484 | 8.2 |
| 2C | 3 | 504 | 10.8 |
| 2D | 4 | 423 | 13 |
| 2E | 5 | 453 | 16.2 |
| 2F | 6 | 435 | 7.2 |
| 2G | 7 | 464 | 11.2 |
| 2H | 8 | 421 | 18.6 |
| 2I | 9 | 411 | 14.2 |
| 2J | 10 | 401 | 11 |
| 2K | 11 | 409 | 8 |
| 2L | 12 | 416 | 8.8 |
| 2M | 13 | 460 | 7.8 |
| 2N | 14 | 414 | 8.4 |
| 2O | 15 | 413 | 14.4 |
| 2P | 16 | 424 | 17.2 |

TABLE 2-continued

| Sample # | Time, Hours | Residual Cyclohexane (ppmw) | Average Imperfections |
|---|---|---|---|
| 2Q | 17 | 429 | 23.8 |
| 2R | 18 | 432 | 11.8 |

TEST PROCEDURES AND OTHER MEASUREMENTS

Residual cyclohexane was determined by using a gas chromatograph. Average imperfections were determined by the following procedure.

A portion of the desired polymer was extruded into a 10 mil sheet. This 10 mil sheet is then scanned by a video/computer system to determine the number of fisheyes per 100 sq. inches of sheet. A fisheye is an imperfection having a size greater than 0.25 sq$^2$ millimeters. The 10 mil sheet was made as follows.

The Extruder was allowed to warm up. The following conditions were used.

| | |
|---|---|
| Zones (1, 2, & 3) | 360° F. |
| Adapter | 365° F. |
| Die | 375° F. |

Two pints of pellets were fed to the feed hopper.

Using a tachometer pot, the screw speed was increased to 10 rpm.

Once polymer flow through the die was established, screw speed was slowly increased to 44–45 rpm while keeping pressure below 1200 psig.

The chill roll was set for:

A speed of 9 ft./min.

Sheet was fed to take-up winders.

Two pints of pellets were purged through extruder before collecting a sample for analysis.

The sheet was adjusted to 10 mill thickness.

COMMENTS ON EXAMPLES

An examination of the data in Table 1 shows that the step-wise lowering of the vacuum pressure in the Second Vessel produces a corresponding step-wise lowering of the residual cyclohexane in the product produced (compare inventive Examples 1, 2, 3, and 4). This same comparison shows very little effect on the average imperfections of the product, with all runs falling within a range of 0.4–5.4.

A comparison of the data for the inventive runs (Table 1) with that for the comparative runs (Table 2) shows that the inventive process produces product with lower residual cyclohexane and lower average imperfections. Residual cyclohexane is 77–164 ppm for the inventive runs whereas it is 401–515 ppm for the comparative runs. Average imperfections are 0.4–5.4 for the inventive runs vs. 4.4–23.8 for the comparative runs. While there is some overlap in the ranges of average imperfections produced by the two processes, the tendency for the comparative process to produce distinctly higher levels of average imperfections is quite clear from the data.

The most direct comparisons between the inventive and comparative processes are between inventive Example 3 vs. comparative Example 1, and inventive Example 4 vs comparative Example 2. A comparison of the data in Tables 1 and 2 for these two Examples shows that the inventive process results in residual cyclohexane in the 81–103 ppm range and average imperfections in the 0.8–2 range, whereas the comparative process results in residual cyclohexane of 424–515 ppm and average imperfections in the 4.4–17.25 range. These results clearly show the superiority of the inventive process in producing lower residual cyclohexane and lower average imperfections.

A comparison of the data in Tables 1 and 2 for inventive Example 4 and comparative Example 2 shows that the inventive Example produces product with 77–84 ppm residual cyclohexane and 1.4–4 average imperfections whereas the comparative Example 2 produces product with 401–504 ppm residual cyclohexane and 7.2–23.8 average imperfections. Again, when closely related inventive and comparative Examples are examined, the superiority of the inventive process in producing lower residual cyclohexane and lower average imperfections is quite clear.

Although this invention has been described in considerable detail with reference to certain preferred versions thereof, other versions are possible. For example, the First Vessel and the Second Vessel could be connected in such a way that they are practically one combined vessel. Therefore, the spirit and scope of the appended claims should not be limited to the summary, detailed description, or examples herein.

That which is claimed is:

1. A process comprising:
    (a) producing a First Composition that comprises diluent and copolymer, where said diluent comprises solvent and optionally volatiles, where said solvent comprises aliphatic compounds, alicyclic compounds, or mixtures of these compounds, and where said copolymer comprises polymerized monomers where said monomers are selected from the group consisting of monovinylarenes and dienes, and where such monovinylarenes and dienes are a majority of said copolymer as measured by weight percent, and where the amount of said copolymer in said First Composition is in the range of about 15 to about 75 weight percent based on the weight of said First Composition, and where said First Composition is at a temperature above the boiling point of the diluent;
    (b) removing a portion of said diluent from said First Composition in a First Vessel, where said First Vessel comprises a First Separating Section and a First Shearing Section, and where said First Separating Section has a temperature in the range of about 110° C. to about 210° C. and a pressure above atmospheric in the range of about 160 kPa about 750 kPa, to produce a Second Composition that has a lower amount of said diluent than said First Composition, and where said First Shearing Section has a temperature in the range of about 110° C. to about 210° C. and a pressure above atmospheric in the range of about 160 kPa to about 750 kPa, to produce a Third Composition that has a lower amount of diluent than said Second Composition; and
    (c) removing a portion of said diluent from said Third Composition in a Second Vessel, where said Second Vessel comprises a Second Separating Section and a Second Shearing Section, and where said Second Separating Section has a temperature in the range of about 110° C. to about 210° C. and a pressure in the range of 0 kPa to about 75 kPa, to produce a Fourth Composition that has a lower amount of said diluent than said Third Composition, and where said Second Shearing Section has a temperature in the range of about 110° C. to about 210° C. and a pressure in the range of 0 kPa to about 75 kPa, to produce a Fifth Composition that has a lower amount of diluent than said Fourth Composition.

2. A process according to claim 1 wherein said solvent is selected from the group consisting of ethane, propane, butane, pentane, hexane, heptane, octane, nonane, decane, cyclopentane, cyclohexane, cycloheptane, cyclooctane, cyclononane, cyclodecane, and mixtures thereof.

3. A process according to claim 1 wherein said solvent is substantially cyclohexane.

4. A process according to claim 1 wherein said solvent is substantially cyclopentane.

5. A process according to claim 1 wherein said monovinylarenes are selected from the group consisting of styrene, alphamethylstyrene, 4-methylstyrene, 3-methylstyrene, 2-methylstyrene, 4-ethylstyrene, 3-ethylstyrene, 2-ethylstyrene, 4-tert-butyl styrene, 2,4-dimethylstyrene, vinyl naphthalene, and mixtures thereof.

6. A process according to claim 1 wherein said monovinylarene is styrene.

7. A process according to claim 1 wherein said dienes are selected from the group consisting of 1,3 butadiene, 2-methyl-1,3-butadiene, 2-ethyl-1,3-butadiene, 2,3-dimethyl-1,3 butadiene, 1,3 pentadiene, and mixtures thereof.

8. A process according to claim 1 wherein said diene is 1,3 butadiene.

9. A process according to claim 1 wherein the amount of copolymer in said First Composition is in the range of about 25 to about 55 weight percent.

10. A process according to claim 1 wherein the amount of copolymer in said First Composition is in the range of about 30 to about 40 weight percent.

11. A process according to claim 1 wherein said First Composition is at a temperature in the range of about 130° C. to about 200° C.

12. A process according to claim 1 wherein said First Composition is at a temperature in the range of about 140° C. to about 190° C.

13. A process according to claim 1 wherein said First Separating Section has a temperature in the range of about 130° C. to about 200° C.

14. A process according to claim 1 wherein said First Separating Section has a temperature in the range of about 140° C. to about 190° C.

15. A process according to claim 1 wherein said First Separating Section has a pressure in the range of about 200 kPa to about 400 kPa.

16. A process according to claim 1 wherein said First Shearing Section has a temperature in the range of about 130° C. to about 200° C.

17. A process according to claim 1 wherein said First Shearing Section has a temperature in the range of about 140° C. to about 190° C.

18. A process according to claim 1 wherein said First Shearing Section has a pressure in the range of about 200 kPa to about 400 kPa.

19. A process according to claim 1 wherein the amount of copolymer in said Third Composition is in the range of about 85 to about 99 weight percent.

20. A process according to claim 1 wherein the amount of copolymer in, said Third Composition is in the range of about 90 to about 99 weight percent.

21. A process according to claim 1 wherein said Second Separating Section has a temperature in the range of about 130° C. to about 200° C.

22. A process according to claim 1 wherein said Second Separating Section has a temperature in the range of about 140° C. to about 190° C.

23. A process according to claim 1 wherein said Second Separating Section has a pressure in the range of 0 to about 50 kPa.

24. A process according to claim 1 wherein said Second Separating Section has a pressure in the range of 0 kPa to about 20 kPa.

25. A process according to claim 1 wherein said Second Shearing Section has a temperature in the range of about 130° C. to about 200° C.

26. A process according to claim 1 wherein said Second Shearing Section has a temperature in the range of about 140° C. to about 190° C.

27. A process according to claim 1 wherein said Second Shearing Section has a pressure in the range of 0 kPa to about 50 kPa.

28. A process according to claim 1 wherein said Second Shearing Section has a pressure in the range of 0 kPa to about 20 kPa.

29. A process consisting essentially of:

(a) producing a First Composition that consists essentially of diluent and copolymer, where said diluent consists essentially of solvent and optionally volatiles, and where said solvent consists essentially of aliphatic compounds, alicyclic compounds, or mixtures of these compounds, and where said copolymer consists essentially of polymerized monomers where said monomers are selected from the group consisting of monovinylarenes and dienes, and where such monovinylarenes and dienes are a majority of said copolymer as measured by weight percent, and where the amount of said copolymer in said First Composition is in the range of about 15 to about 75 weight percent based on the weight of said First Composition, and where said First Composition is at a temperature above the boiling point of the diluent;

(b) removing a portion of said diluent from said First Composition in a First Vessel, where said First Vessel comprises a First Separating Section and a First Shearing Section, and where said First Separating Section has a temperature in the range of about 110° C. to about 210° C. and a pressure above atmospheric in the range of about 160 kPa to about 750 kPa, to produce a Second Composition that has a lower amount of said diluent than said First Composition, and where said First Shearing Section has a temperature in the range of about 110° C. to about 210° C. and a pressure above atmospheric in the range of about 160 kPa to about 750 kPa, to produce a Third Composition that has a lower amount of diluent than said Second Composition; and (c) removing a portion of said diluent from said Third Composition in a Second Vessel, where said Second Vessel comprises a Second Separating Section and a Second Shearing Section, and where said Second Separating Section has a temperature in the range of about 110° C. to about 210° C. and a pressure in the range of 0 kPa to about 75 kPa, to produce a Fourth Composition that has a lower amount of said diluent than said Third Composition, and where said Second Shearing Section has a temperature in the range of about 110° C. to about 210° C. and a pressure in the range of 0 kPa to about 75 kPa, to produce a Fifth Composition that has a lower amount of diluent than said Fourth Composition.

* * * * *